United States Patent [19]

Watada et al.

[11] Patent Number: 5,366,831
[45] Date of Patent: Nov. 22, 1994

[54] NICKEL ELECTRODE FOR ALKALINE BATTERY

[75] Inventors: Masaharu Watada; Masahiko Oshitani; Masuhiro Onishi, all of Takatsuki, Japan

[73] Assignee: Yuasa Corporation, Osaka, Japan

[21] Appl. No.: 975,579

[22] PCT Filed: Jun. 10, 1992

[86] PCT No.: PCT/JP92/00740

§ 371 Date: Feb. 9, 1993

§ 102(e) Date: Feb. 9, 1993

[87] PCT Pub. No.: WO92/22934

PCT Pub. Date: Dec. 23, 1992

[30] Foreign Application Priority Data

Jun. 14, 1991 [JP] Japan .................................. 3-170587
Oct. 28, 1991 [JP] Japan .................................. 3-309960

[51] Int. Cl.$^5$ .................................................. H01M 4/62
[52] U.S. Cl. ......................................... 429/223; 429/232
[58] Field of Search ................................. 429/223, 232

[56] References Cited

U.S. PATENT DOCUMENTS

| | | | |
|---|---|---|---|
| 4,016,091 | 4/1977 | Jackovitz et al. | 429/223 X |
| 4,844,999 | 7/1989 | Oshitani et al. | 429/223 |

FOREIGN PATENT DOCUMENTS

| | | |
|---|---|---|
| 59-83347 | 5/1984 | Japan . |
| 60-131765 | 7/1985 | Japan . |
| 63-124371 | 5/1988 | Japan . |
| 1-112663 | 5/1989 | Japan . |
| 230061 | 1/1990 | Japan . |
| 2109261 | 4/1990 | Japan . |
| 346758 | 2/1991 | Japan . |
| 378965 | 4/1991 | Japan . |

*Primary Examiner*—Stephen Kalafut
*Attorney, Agent, or Firm*—Wegner, Cantor, Mueller & Player

[57] ABSTRACT

In a paste-type nickel electrode using nickel hydroxide powder controlled to under 0.1 ml/g incl. as an active material so as to be increased in its density, a nickel electrode for alkaline battery in which II-group elements and cobalt are included in the nickel hydroxide powder in solid solution state, so that swelling of electrode can be prevented and charge efficiency at a high temperature can be improved.

2 Claims, 5 Drawing Sheets

NICKEL ELECTRODE FOR ALKALINE BATTERY

TECHNICAL FIELD

This invention relates to a nickel electrode for use in an alkaline battery such as a nickel-cadmium battery, a nickel-metal hydride battery etc.

BACKGROUND ART

As a nickel electrode made up by directly loading a nickel hydroxide powder forming an active material, there are a paste-type electrode in which the nickel hydroxide powder is formed into a paste and loaded in a porous substrate comprising a nickel, and a button-type electrode and a pocket-type electrode in which the nickel hydroxide powder is wrapped by a current collector. The porous substrate comprising an alkaline-proof metal forming the current corrector is comparatively expensive in the paste-type electrode, so that a study has been made on an electrode utilizing a core metal as its current collector.

On the other hand, with a recent tendency to minimize a size and weight of portable electric equipment, a demand for enhancing an energy density is increasing against batteries serving as portable power sources. In order to meet this demand, a nickel-cadmium battery, a nickel-metal hydride battery and a nickel-zinc battery etc., which utilize a paste-type nickel electrode, have been developed and put to practical use.

The paste-type nickel electrode is made up by forming the nickel hydroxide powder into a paste and directly loading it in a porous substrate comprising a nickel. Therefore, in order to obtain a paste-type nickel electrode having a high energy density, it is enough to increase a porosity of the electrode substrate and a density of the nickel hydroxide powder forming the active material.

A nickel fibrous porous body and a foamed nickel porous body etc. which have a porosity of about 95% which is approximately a manufacture limit of porosity have been put in practical use for the electrode substrate. A nickel hydroxide powder an inner pore volume of which is controlled to under 0.1 ml/g incl. has been developed for the active material. Since the nickel hydroxide powder has a bulk density as high as about 2 g/ml, it becomes possible to load the powder by about 20% more than conventional one. By using the high-porous electrode substrate and the high-density nickel hydroxide powder, it becomes possible to make up a paste-type nickel electrode having 550 mAh/ml or larger so that the electrode is applied to a battery system having a high energy density.

On the other hand, the nickel hydroxide powder the inner pore volume of which is controlled to under 0.1 ml/g incl. has a feature that it is obtained in a spherical shape caused by its manufacturing process. For this reason, clearances are produced between powder particles under a loaded state as illustrated by FIG. 7, and this point has been a negative primary factor to increase the energy density.

DISCLOSURE OF INVENTION

In the conventional paste-type nickel electrode having a high energy density, there have been serious problems of (1) a swelling of electrode due to a decrease in density of the active material caused by repeated charging and discharging and (2) a low charging efficiency at a high temperature. In order to solve the above problem (1), it has so far been known that adding a small quantity of cadmium to the active material in a solid solution state has been effective. Further, in order to solve the above problem (2), a method of adding hydroxide lithium to potassium hydroxide solution used as an electrolyte has been used generally.

However, the use of cadmium which is hazardous heavy metal becomes unpreferable in connection with the recent environmental problem, so that a development of new additional element is desired earnestly in place of cadmium. In addition, in the above method to solve the problem (2), there have been demerits of a lowering of discharge voltage and a decrease in discharge capacity at a low temperature.

While, from the stand point of increasing the energy density, it is desired to minimize clearances between powder particles produced when loading the nickel hydroxide powder.

An object of a first invention of this application is to provide a paste-type nickel electrode i.e. a nickel electrode for alkaline battery, which can prevent the swelling of electrode without causing a primary factor of environmental pollution and which is excellent in charge efficiency over a wide range of temperature especially at a high temperature.

An object of a second invention is to provide a nickel electrode for alkaline battery in which nickel hydroxide powder is loaded to a high density by minimizing clearances between loaded nickel hydroxide powder particles.

The first invention provides, in a nickel electrode in which nickel hydroxide powder an inner pore volume of which is controlled to under 0.1 ml/g incl. is used as an active material, a nickel electrode for alkaline battery including II-group element and cobalt in the nickel hydroxide powder in a solid solution state.

Only zinc or zinc and one or more kinds of other element are used for the above II-group element. A content of the above II-group element is preferably over 1 wt % incl. when converted to zinc only, and a content of cobalt is preferably over 2 wt % incl. A sum of the contents of II-group element and cobalt is preferably under 10 wt % incl.

The inventor found that the electrode swelling of nickel electrode using the nickel hydroxide powder increased in its density by controlling the inner pore volume was caused by low-density γ-type nickel oxyhydroxide (γ-NiOOH) formed at time of repeated charging and discharging, that solid solution addition of cadmium controlled the formation of γ-NiOOH. The inventor further found that the II-group element such as zinc and magnesium etc. also acts in the same manner as cadmium. Namely, in the first invention of this application, the swelling of electrode is controlled by the II-group element included in the solid solution state. Especially, when zinc is included over 1 wt % incl., the formation of γ-NiOOH is effectively controlled. In addition, the II-group element included in the solid solution state is active to shift an oxygen evolution potential at the end of charging to a noble side. On the other hand, when the nickel electrode using the nickel hydroxide powder increased in its density is charged at a high temperature, oxidation reaction of the active material and oxygen evolution reaction occur simultaneously, i.e. an oxygen overvoltage which is a difference between an oxygen evolution potential and an oxidation potential, is small so that the oxygen evolution reaction becomes predominant to reduce the charging efficiency. However, when cobalt exists in the active material in solid solution state, the charging oxidation potential shifts to a base side, so that the oxygen overvoltage becomes large to improve the charging efficiency at a high temperature. This is effective especially when cobalt is included over 2 wt % incl. When only cobalt is included without including the II-group element at all, actions of controlling the formation of γ-NiOOH and shifting the oxygen evolution potential to the noble side are not recognized.

Namely, in the first invention of this application, the formation of γ-NiOOH is controlled by the II-group element so that the swelling of electrode is prevented. The oxygen evolution potential of active material is shifted to the noble side by the II-group element and the charging oxidation potential of active material is shifted to the base side by the cobalt. Consequently, the oxygen overvoltage is increased more than the case of single II-group element and single cobalt by their synergetic action, so that the charging efficiency at a high temperature is improved. Accordingly, the paste-type nickel electrode having a high performance and free from pollution, i.e. the nickel electrode for alkaline battery can be obtained.

The second invention of this application provides, in a nickel electrode in which nickel hydroxide powder an inner pore volume of which is controlled to under 0.1 ml/g incl. is used as an active material, a nickel electrode for alkaline battery in which spherical nickel hydroxide particles having diameters ranging from 20 to 40 microns are powdered to be put in use.

Powdered nickel particles may be used together with not-powdered nickel particles.

When the spherical nickel hydroxide particles having diameters ranging from 20 to 40 microns are powdered to be put in use, clearances between powder particles are filled as shown by FIG. 8 so that clearances between particles are minimized and the density of active material can be improved. Therefore, a nickel electrode for alkaline battery increased in its density can be obtained.

BEST MODE FOR CARRYING OUT THE INVENTION

Embodiment 1

Only zinc was used as the II-group element, and nickel hydroxide powder including zinc and cobalt in solid solution state was prepared by the following method. Ammonium nitrate was added to aqueous solution which was formed by adding specified amounts of zinc nitrate and cobalt nitrate to nickel nitrate. Then, the solution was violently stirred while dropping sodium hydroxide solution therein to decompose complex ion, and nickel hydroxide particles including zinc and cobalt in solid solution state was gradually deposited and grown.

Figure 1:
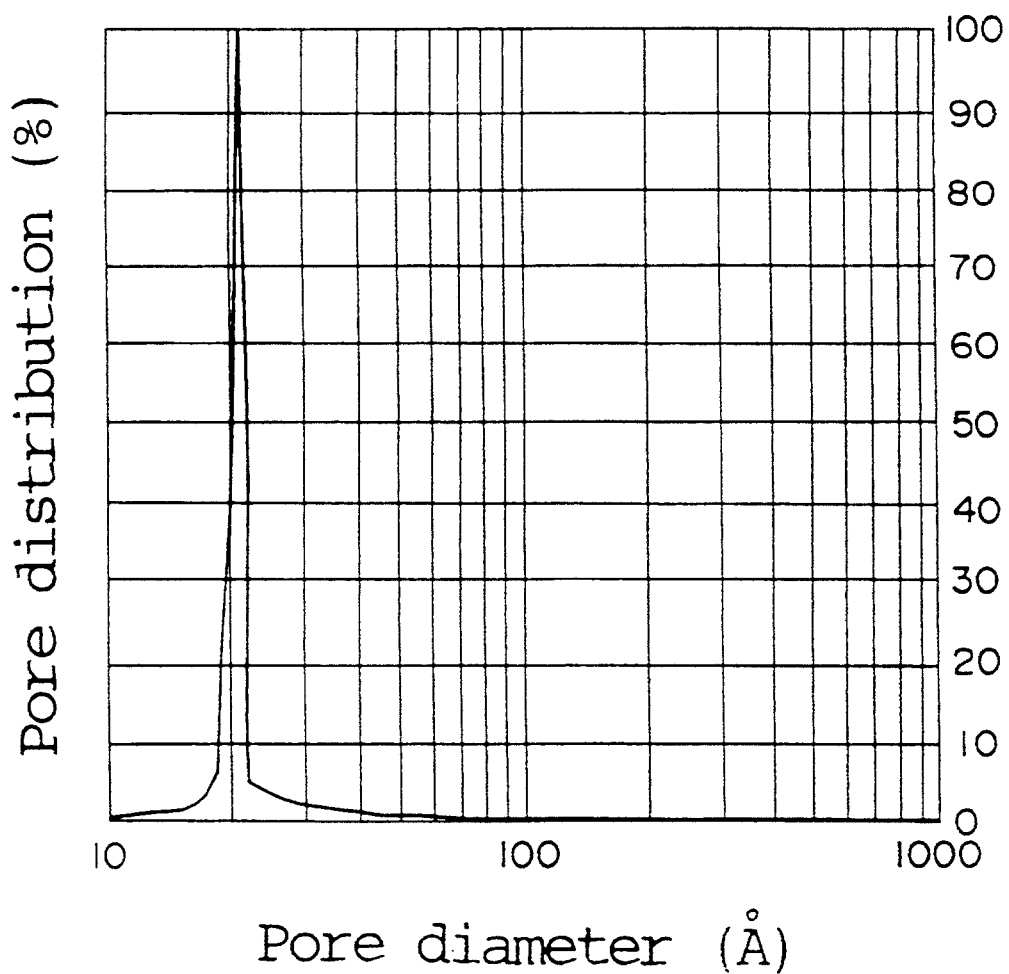
FIG. 1 is a diagram showing a pore diameter distribution of nickel hydroxide powder used in an embodiment 1.

FIG. 1 is the diagram showing the pore diameter distribution of nickel hydroxide powder prepared as described above. An axis of abscissa denotes a pore diameter (Å) and an axis of ordinate denotes a pore diameter distribution. This nickel hydroxide powder includes 5 wt % of zinc and 5 wt % of cobalt in solid solution state. An inner pore volume of the nickel hydroxide powder is 0.02 ml/g, and it can be understood that this powder has a high density controlled to under 0.1 ml/g incl. Its bulk density was 2.0 g/ml. Even in case where the contents of zinc and cobalt were different from the above values, the pore diameter distribution was similar to the above. However, this was effected only when the zinc content was over 1 wt % incl., cobalt content was over 2 wt % incl. and the sum of zinc and cobalt contents was under 10 wt % incl.

A small quantity of cobalt monoxide powder was mixed to the nickel hydroxide powder thus prepared, aqueous solution which was increased in viscosity by carboxymethylcellulose was added thereto to form a paste, and a specified amount of the paste was loaded in a substrate comprising a nickel fibrous porous body so that the paste-type nickel electrode of this embodiment was made up. This electrode was charged and discharged in an electrolyte forming potassium hydroxide solution or lithium hydroxide solution by using a cadmium anode as a counter-electrode, so that an electrode swelling factor and a charge efficiency at a high temperature etc. were measured.

Figure 2:
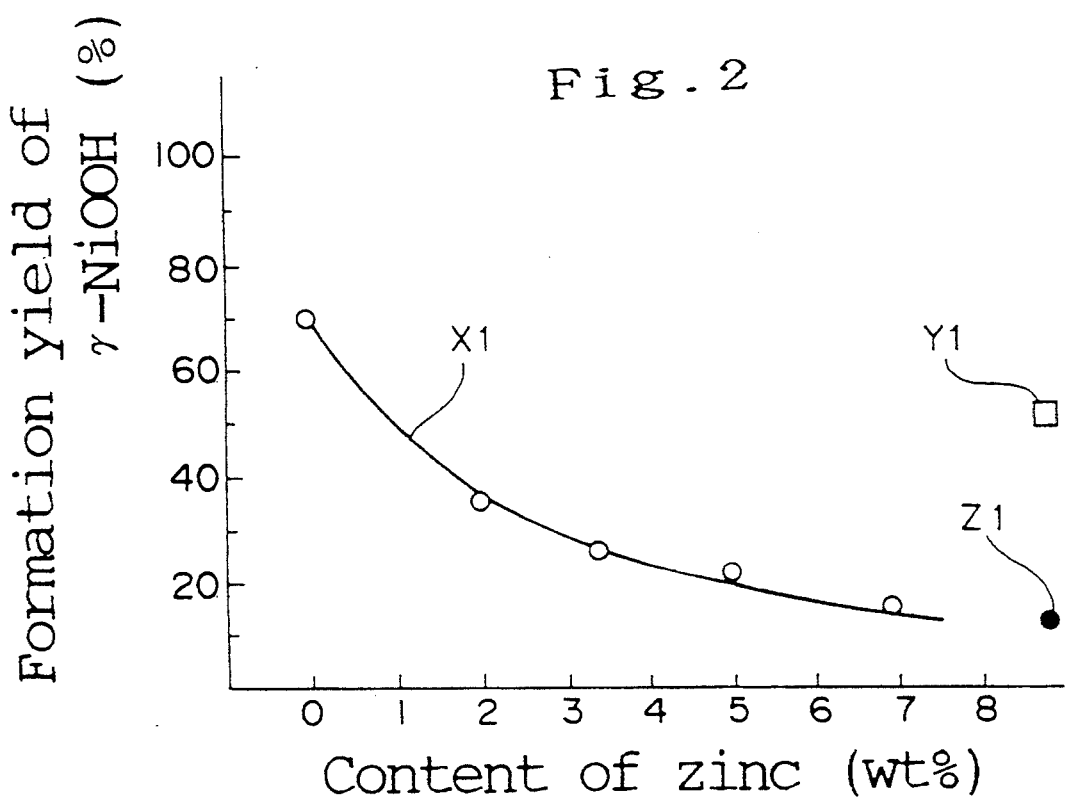
FIG. 2 is a diagram showing a relation between content of zinc and formation yield of γ-NiOOH in the embodiment 1.

FIG. 2 is the diagram showing the relation between content of zinc (wt %) and formation yield of γ-NiOOH (%). In this figure, Y1 shows a case where only cobalt of 5 wt % is included and Z1 shows a case where zinc of 5 wt % and cobalt of 5 wt % are included, i.e. this embodiment. X1 shows a case where only zinc is included. The formation yield of γ-NiOOH was obtained in such a way that the nickel electrode was charged with a high current density of 1 C and then subjected to X-ray analysis. As seen from X1, the formation yield of γ-NiOOH decreases in proportion to the content of zinc. Since practical troublesome swelling of electrode will not occur when the formation yield of γ-NiOOH is in a range of under 50% incl., it is preferable that the content of zinc is over 1 wt % incl. as seen from FIG. 2. This also applies in the same way to the case of zinc and cobalt included, as seen from X1 and Z1. However, as shown by Y1, the decrease in formation yield of γ-NiOOH i.e. the effect of control on formation of γ-NiOOH was not observed in case where only cobalt was included and its content was in a range of under 20 wt % incl.

Figure 3:
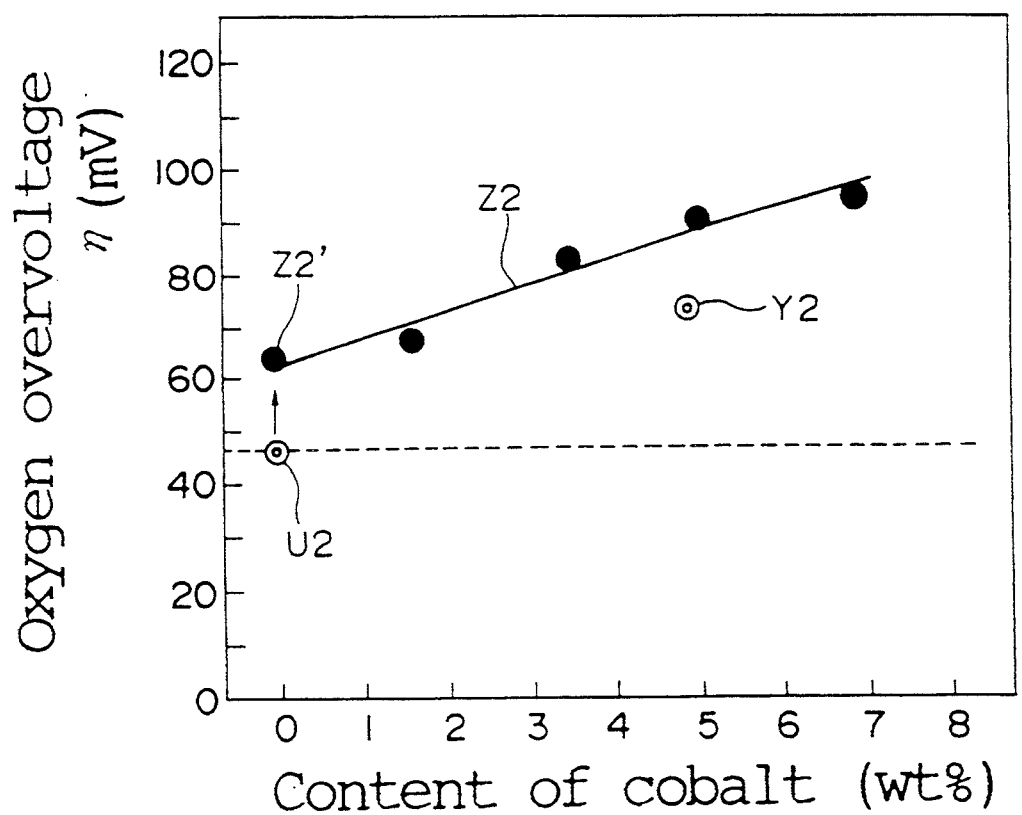
FIG. 3 is a diagram showing a relation between content of cobalt and oxygen overvoltage in the embodiment 1.

FIG. 3 is the diagram showing the relation between content of cobalt (wt %) and oxygen overvoltage η(mV). In this figure, Z2 shows a case where zinc and cobalt are included, i.e. this embodiment. Provided that the content of zinc is constant at 5 wt %. Y2 shows a case where only cobalt of 5 wt % is included and U2 shows a case where zinc and cobalt are not included, i.e. only nickel is included. In Z2, a case where a content of cobalt is zero i.e. Z2' shows a case where only zinc of 5 wt % is included. Measurement was carried out on conditions with temperature of 20° C. and charge rate of 0.1 C×15 hours. As seen from relations of Z2' and Y2 to U2, the oxygen overvoltage when including only zinc or cobalt becomes larger than that when including nothing. However, as shown by Z2, the oxygen overvoltage when including zinc together with cobalt becomes further larger than that. This may be attributable to a synergetic effect of shifting of oxygen evolution potential to a noble side owing to the zinc and shifting of oxidation voltage to a base side owing to the cobalt.

Figure 4:
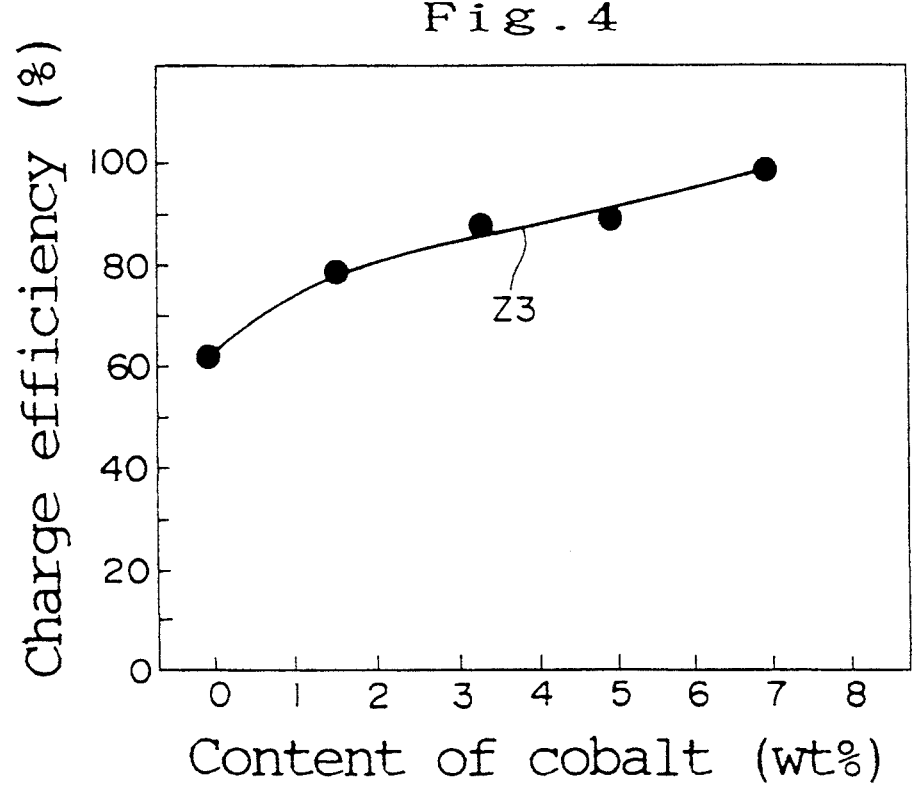
FIG. 4 is a diagram showing a relation between content of cobalt and charging efficiency at high temperature of 45° C. in the embodiment 1.

FIG. 4 is the diagram showing the relation between content of cobalt (wt %) and charge efficiency (%) at high temperature of 45° C. In this figure, Z3 shows a case where zinc and cobalt are included, i.e. this embodiment. Provided that the content of zinc is constant at 5 wt %. Measurement was carried out on conditions with temperature of 45° C., charge rate of 0.1 C X 15 hours and discharge of 0.2 C. As seen from this figure, the charge efficiency becomes large in proportion to the content of cobalt. This may be attributable to a fact that the charge efficiency is increased by an increase in the oxygen overvoltage shown .by FIG. 3. As seen from FIG. 4, a practically satisfied charge efficiency of over 80% incl. can be obtained when the content of cobalt is over 2 wt % incl. Accordingly, it is preferable to use a content of cobalt of over 2 wt % incl. However, since the discharge voltage is lowered as the content of cobalt is increased, it is preferable to use the content of cobalt of under 10 wt % incl.

Figure 5:
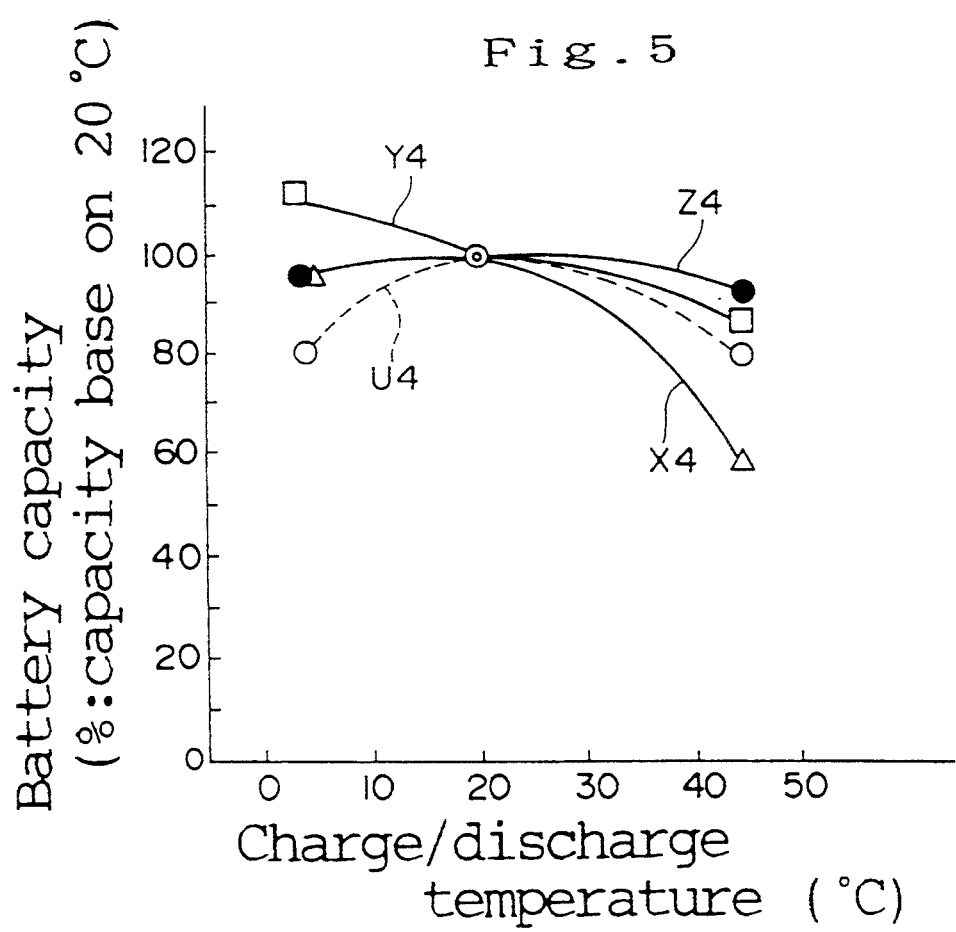
FIG. 5 is a diagram showing capacity characteristics of the embodiment 1 and a comparison example.

FIG. 5 is the diagram showing the capacity characteristics of nickel electrodes of this embodiment and comparison example. An axis of abscissa denotes a charge/discharge temperature (°C.) and an axis of ordinate denotes a battery capacity (%: capacity base on 20° C.). In this figure, Z4 shows a case where zinc of 5 wt % and cobalt of 5 wt % are included, i.e. this embodiment; in which X4 shows a comparison example including only zinc of 5 wt %, Y4 shows a comparison example including only cobalt of 5 wt %, and U4 shows a comparison example including zinc of 5 wt % and adding lithium hydroxide to an electrolyte. A type of battery is KR-AA, and measurement was carried out on conditions with charge rate of 0.3 C×5 hours and discharge of 1 C. The present embodiment shown by Z4 develops a scarcely fluctuation and stable capacity characteristic in a temperature range of 5° to 45° C. While, in the comparison example shown by U4, the capacity at high temperature is improved, but the capacity at low temperature is decreased so that the capacity is not stable over a wide range of temperature. In the comparison example shown by Y4, γ-NiOOH is formed at a low temperature and the swelling of electrode is produced with an increase in the capacity, so that the capacity is not stable over a wide range of temperature.

Incidentally, since zinc or cobalt included is a substance which does not act as the active material itself, an increase in its content will cause a decrease in capacity per unit weight of active material by that amount. Therefore, it is preferable to use a sum of zinc and cobalt contents of under 10 wt % incl. from the practical point of view.

As described above, in the present embodiment, the swelling of electrode can be prevented because zinc is included in the solid solution state, and a stable capacity over a wide range of temperature can be obtained by increasing the oxygen overvoltage in a synergetic manner especially by improving the charge efficiency at a high temperature because zinc and cobalt are included in the solid solution state. Further, since cadmium which has been used in conventional example is not used, an environmental pollution can be prevented.

Embodiment 2

Zinc and barium were used as the II-group element, and nickel hydroxide powder including zinc, barium and cobalt in solid solution state was prepared by the same manner as the embodiment 1. Ammonium nitrate was added to aqueous solution which was formed by adding specified amounts of zinc nitrate, barium nitrate and cobalt nitrate to nickel nitrate. Then, the solution was violently stirred while dropping sodium hydroxide solution therein to decompose complex ion, and nickel hydroxide particles including zinc, barium and cobalt in solid solution state were gradually deposited and grown.

Using the nickel hydroxide powder thus prepared, the paste-type nickel electrode of this embodiment was made up in the same manner as the embodiment 1. This electrode was charged and discharged in an electrolyte forming potassium hydroxide solution or lithium hydroxide solution by using a cadmium anode as a counter-electrode, so that an electrode swelling factor i.e. the formation yield of γ-NiOOH was measured.

Figure 6:
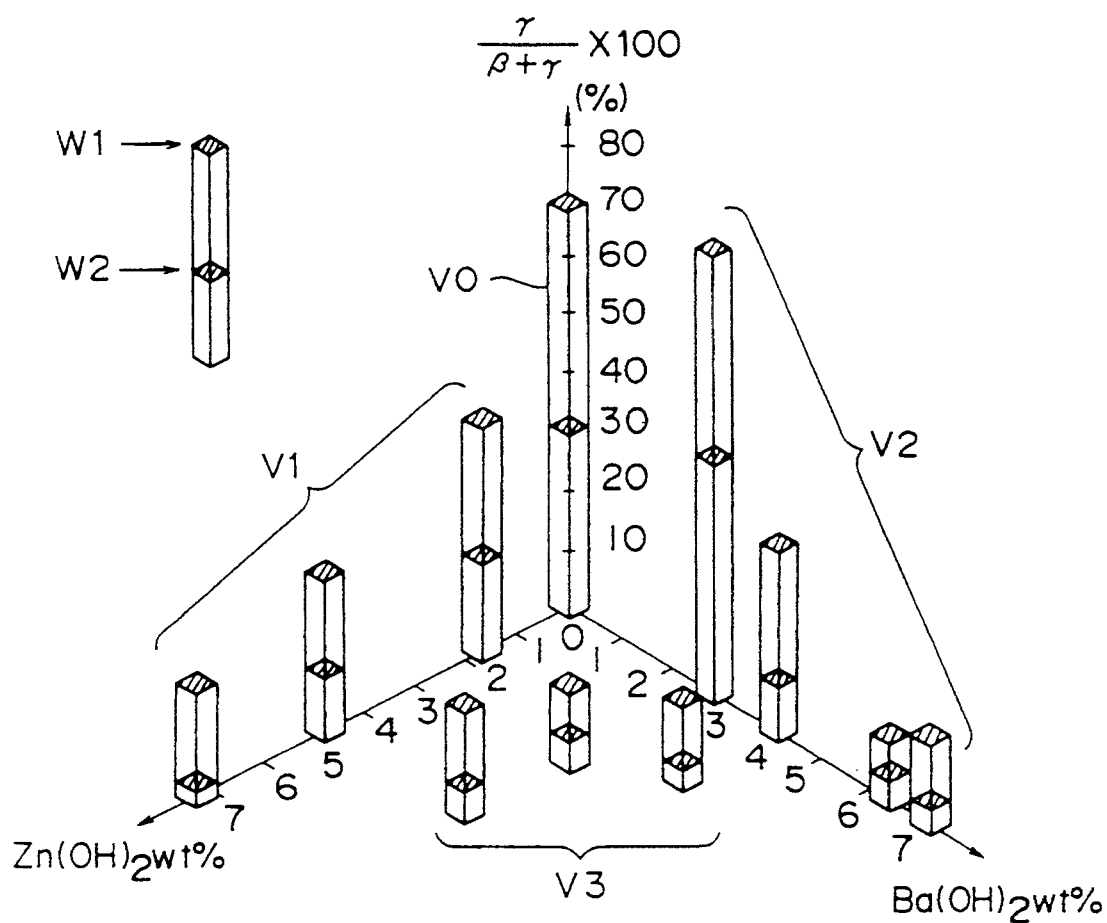
FIG. 6 is a diagram showing a relation between contents of zinc and cobalt and formation yield of γ-NiOOH in the embodiment 2.
Figure 7:
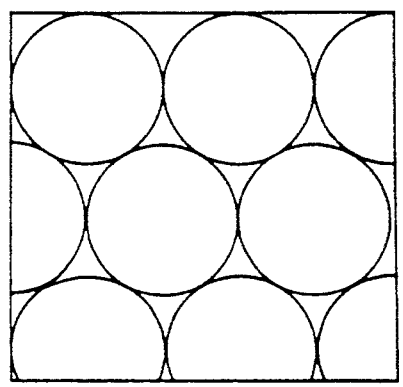
FIG. 7 is a schematic diagram showing a state where spherical nickel hydroxide particles increased in density by controlling inner pore volume are loaded as they are.
Figure 8:
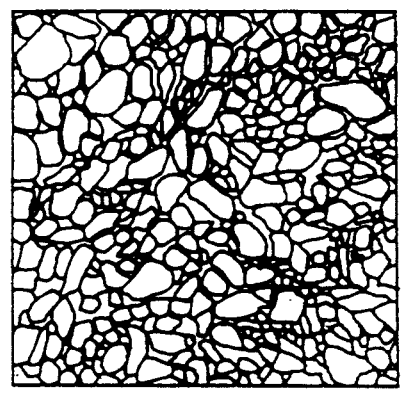
FIG. 8 is a schematic diagram showing a loaded state of nickel hydroxide powder in the embodiment 3.

FIG. 6 is the diagram showing the relation between contents of zinc and barium (wt %) and the formation yield of γ-NiOOH(%). An axis of abscissa denotes a formation yield of γ-NiOOH, and β and γ in the figure denote a type of NiOOH. The content of cobalt is constant at 5 wt %. In this figure, V0 shows a case where both zinc and barium are not included i.e. only cobalt is included, V1 shows a case where only zinc is included, V2 shows a case where only barium is included, and V3 shows a case where zinc together with barium are included, i.e. this embodiment. Here, zinc and barium are included as hydroxide. In each bar graph, W1 denotes an end of charge and W2 denotes an end of discharge, as illustrated by a bar graph at a left upper part of the figure. As seen from V3 in relation to V1 and V2, the formation yield of γ-NiOOH of the case where both zinc and barium are included is smaller than that of the case where zinc or barium is included independently.

As described above, this embodiment using zinc and barium as the II-group element also gives the same function and effect as the embodiment 1.

Embodiment 3

An apparent density of spherical nickel hydroxide particles having an inner pore volume of under 0.1 ml/g incl. and a diameter of 20 to 40 microns, is 1.8 to 2.1 g/cm³. An apparent density of particles powdered to diameters of 4 to 8 microns was measured again and proved to be increased to 2.1 to 2.5 g/cm³. 2.0 wt % of cobalt monoxide powder and 8.0 wt % of graphite powder were mixed to 90 wt % of prepared nickel hydroxide powder to form an active material. 3 wt % of polytetrafluoroethylene was added to this active material as a binder to be formed into a sheet. This active material sheet was press bonded to a nickel mesh substrate, dried, and pressed to make up the nickel electrode of this embodiment having a thickness of 0.7 mm. This nickel electrode was combined with a paste-type cadmium electrode as its counter-electrode, so that a battery including flowable electrolyte was made up as a prototype by using potassium hydroxide solution having a specific gravity of 1.26 as the electrolyte.

A nickel electrode was made up as a comparison example in the same way by using nickel hydroxide powder before subjected to the powdering and nickel hydroxide powder having diameters of 4 to 8 microns from the beginning, respectively. Further, a battery was made up as a prototype in the same way by using the nickel electrode of comparison example.

These batteries were left as they were for 24 hours to make cobalt monoxide dissolve and redeposite, and were subjected to 10 cycles of repeated test, wherein a discharge at 0.1 CA for 15 hours and a discharge down to a final voltage of 1.00 V at 0.2 CA were carried out at a temperature of 20° C. The batteries were subjected to the same cycles of test with conditions of a discharge at 1.0 CA (final voltage: 1.00 V), that at 2.0 CA (final voltage: 0.90 V) and that at 3.0 CA (final voltage: 1.00 V).

Table 1 shows discharge capacities of respective batteries discharged at 0.2 CA. A denotes a battery using the nickel electrode of this embodiment, B denotes a battery using the nickel electrode of comparison example prepared by the nickel hydroxide powder before subjected to the powdering, and C denotes a battery using the nickel electrode of comparison example prepared by the nickel hydroxide powder having diameters of 4 to 8 microns from the beginning, respectively. Table 2 shows a change of utilization factor of active material caused by high-rate discharge.

TABLE 1

| | Battery | | |
|---|---|---|---|
| | A | B | C |
| Discharge capacity (mAh/cc) | 530 | 490 | 530 |

TABLE 2

| | | Discharge rate (CA) | | | |
|---|---|---|---|---|---|
| | | 0.2 | 1.0 | 2.0 | 3.0 |
| | | Utilization factor of active material (%) | | | |
| Battery | A | 91 | 85 | 77 | 76 |
| | B | 93 | 87 | 78 | 74 |
| | C | 92 | 65 | 47 | 40 |

As seen from Table 1, the discharge capacity of battery A is larger than that of battery B and equal to that of battery C. Further, as seen from Table 2, the utilization factor of active material of battery A is better than that of battery C. Accordingly, the battery. A is more excellent than the batteries B and C in the discharge capacity and the utilization factor of active material. Namely, in the nickel electrode of this embodiment using the powdered spherical nickel hydroxide particles having diameters of 20 to 40 microns, the loading amount of active material increases and the discharge capacity per unit volume is improved. In addition, deterioration of the high-rate discharge characteristic is not recognized.

The cobalt monoxide is used as the addition agent in this embodiment, however, $\alpha$-Co(OH)$_2$ or $\beta$-Co(OH)$_2$ may be used and will provide similar function. Similar function was observed when metallic cobalt powder was used, although its effect was smaller than that when using divalent cobalt compound powder.

As described above, according to this embodiment, since the spherical nickel hydroxide particles having diameters of 20 to 40 microns were powdered and used, the nickel hydroxide powder can be loaded with a higher density and the nickel electrode for alkaline battery of high-performance and high-capacity can be obtained.

INDUSTRIAL APPLICABILITY

Swelling of electrode can be prevented without causing any environmental pollution and charge efficiency is excellent over a wide range of temperature, so that the electrode of this invention can be preferably utilized as a paste-type nickel electrode with high energy density for an alkaline battery.

What is claimed is:

1. A nickel electrode for an alkaline battery comprising nickel hydroxide powder having an inner pore volume of less than 0.1 ml/g inclusive as an active material, said nickel hydroxide powder comprising cobalt and at least two II-group elements in a solid solution, said II-group elements comprising zinc and barium, wherein said II-group elements are present in an amount of more than 1 Wt % when converted to zinc only, and said cobalt is present in an amount of more than 2 wt % inclusive.

2. A nickel electrode for an alkaline battery comprising nickel hydroxide powder having an inner pore volume of less than 0.1 ml/g inclusive as an active material, said nickel hydroxide powder comprising cobalt and at least two II-group elements in a solid solution, said II-group elements comprising zinc and barium, wherein said II-group elements are present in an amount of more than 1 wt % when converted to zinc only, said cobalt is present in an amount of more than 2 wt % inclusive, and said II-group elements and said cobalt are together present in an amount less than 10 wt % inclusive.

* * * * *